(12) United States Patent
Koch et al.

(10) Patent No.: US 6,673,759 B1
(45) Date of Patent: Jan. 6, 2004

(54) CLEANING MATERIAL FOR EXTRUDERS

(75) Inventors: Uwe Koch, Gerolsheim (DE); Rainer Klenz, Hassloch (DE); Peter Friel, Frankenthal (DE); Brigitte Gareiss, Obersülzen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/868,096

(22) PCT Filed: Dec. 14, 1999

(86) PCT No.: PCT/EP99/09932

§ 371 (c)(1),
(2), (4) Date: Jun. 14, 2001

(87) PCT Pub. No.: WO00/37236

PCT Pub. Date: Jun. 29, 2000

(30) Foreign Application Priority Data

Dec. 18, 1998 (DE) .......................................... 198 58 672

(51) Int. Cl.$^7$ ................................................. C11D 3/37
(52) U.S. Cl. ....................... 510/188; 510/475; 510/476; 264/39
(58) Field of Search ................................. 510/475, 476, 510/188; 264/39

(56) References Cited

U.S. PATENT DOCUMENTS

| | | | | |
|---|---|---|---|---|
| 3,776,774 A | * | 12/1973 | Miller | ............................ 134/7 |
| 3,869,525 A | * | 3/1975 | Miller | ........................ 260/873 |
| 5,254,175 A | | 10/1993 | Kaiser | |
| 5,958,313 A | * | 9/1999 | Yamamoto et al. | ............ 264/39 |
| 6,060,445 A | * | 5/2000 | Chandraker et al. | ......... 510/475 |

FOREIGN PATENT DOCUMENTS

| | | | |
|---|---|---|---|
| EP | 800 910 | | 10/1997 |
| EP | 800910 | * | 10/1997 |
| JP | 55093436 | * | 7/1980 |
| JP | 55095545 | * | 7/1980 |
| WO | 95/17268 | | 6/1995 |

OTHER PUBLICATIONS

Abst. 02060727–Patent Abst. of Japan.
Abst. 63047117–Patent Abst. of Japan.
Abst. 5509346– Patent Abst. of Japan.
Abst. 55095545—Patent Abst. of Japan.
Abst. 04180964—Patent Abst. of Japan.

* cited by examiner

Primary Examiner—Charles Boyer
(74) Attorney, Agent, or Firm—Keil & Weinkauf

(57) ABSTRACT

The invention relates to a cleaning composition for apparatus for processing thermoplastic melts, which composition essentially comprises discrete particles capable of plastic deformation and made from a thermoplastic (A) with a melting point above 200° C. and with a crystallinity of not more than 50%, and comprises an amorphous or semicrystalline thermoplastic (B) with a processing temperature below the melting point of the thermoplastic (A). The proportion of the thermoplastic (A) is from 1 to 95% by weight and that of the thermoplastic (B) is from 5 to 95% by weight. The total of the percentage proportions by weight of (A) and (B) is always 100% or less.

The discrete particles made from the thermoplastic (A) and capable of plastic deformation have a very effective cleaning action, while the amorphous or semicrystalline thermoplastic (B) acts as a liquid or flowable carrier for the particles, which are made from the thermoplastic (A) and/or contamination which has been released, and are capable of plastic deformation.

10 Claims, No Drawings

CLEANING MATERIAL FOR EXTRUDERS

The invention relates to a cleaning composition for apparatus for processing thermoplastic melts.

When thermoplastics are processed on machinery with screws, long running times are frequently required to change from one thermoplastic to another, since thermoplastic melt from the previously used material remains in the machinery. During a changeover, these residues are gradually discharged and contaminate the moldings or semifinished products thus produced, and these therefore have to be rejected. A material change of this type can extend over hours or days, creating high costs for energy and the raw materials required, taking a considerable amount of time and sacrificing machine utilization. This applies in particular when the materials involved in the change are thermoplastics which differ in their processing temperature and/or in their chemical structure or their composition, or when a change is required from dark to light colors or from an opaque product to a transparent or glass-clear thermoplastic, such as polystyrene.

To accelerate this procedure, it has been usual in the prior art to take the extruder out of operation, disassemble and clean the barrel and screw and then reassemble these after cleaning. Shutting down the extruder and subsequently cleaning not only incurred considerable costs but also led to damage to internal surfaces of parts of the extruder resulting from the use of tools. In addition, during disassembly there is a high risk of damaging add-on parts, e.g. temperature sensors or gaskets.

In order to avoid this awkward procedure, it is also known in the prior art, via DE-A-23 21 883, that a cleaning composition can be used. This is fed into the extruder inlet and conveyed through the extruder until the extruder surfaces are free of residues of material, in particular of encrusted residues of material. This is achieved using a cleaning composition composed of a brittle thermoplastic polymer which is embedded into a second polymer. The cleaning temperature in the extruder is controlled in such a way that this second polymer is liquid or flowable during the cleaning procedure. It thus forms a carrier for the particles of the first polymer. It is important that the brittle polymer can be crushed or comminuted during its passage through the extruder screw. The cleaning action of this composition consists in scrubbing by the crushed or comminuted particles to loosen and remove the deposits in the contaminated zones of the extruder. The second, liquid or flowable, polymer component has the task of conveying the particles of the first brittle polymer through the extruder and of taking up deposits released from the surfaces within the extruder.

A disadvantage of this process is that here, too, damage can result from the use of brittle polymer particles which may also be sharp as a result of comminution, and which are intended to scrub the internal surfaces of parts of the extruder. There is also the risk that the crushed or comminuted brittle polymer particles in this known cleaning composition will remain held in cavities of the extruder or in particular during passage through narrowing connector pieces or adapters, thus clogging the extruder so that it needs to be cleaned by hand anyway. This cleaning composition is also unsuitable for thermoplastics which melt above the temperature at which the first, comminuted, polymer used is brittle, since in that case the polymer particles soften and lose their brittleness and thus their cleaning action.

DE-A-38 02 127 has disclosed a process for cleaning extruders by conveying through the extruder one or more organic or inorganic salts together with one or more organic or inorganic solvents in which the respective salt dissolves. A disadvantage of this process is that the use of the solvents can cause corrosion in the area of the feed zone of the extruder screw. In addition, the solvent vapor produced in the hot extruder requires particular protective and preventive measures. This process can be used to clean vented screws only if the vent aperture has been sealed, since the solvent escapes in the area which is at atmospheric pressure.

It is an object of the present invention, taking into account this prior art, to provide, for apparatus for processing thermoplastic melts, a cleaning composition which can effectively avoid damaging the internal walls of the extruder or clogging during passage through narrowing parts of the extruder, and at the same time achieves a high degree of cleaning action.

We have found that this object is achieved by a cleaning composition which essentially comprises discrete particles capable of plastic deformation and made from a thermoplastic (A) with a melting point above 250° C. and with a crystallinity of not more than 50%, and comprises an amorphous or semicrystalline thermoplastic (B) with a processing temperature below the melting point of the thermoplastic (A), where the proportion of the thermoplastic (A) is from 1 to 95% by weight and that of the thermoplastic (B) is from 5 to 95% by weight, and the total of the percentage proportions by weight of (A) and (B) is always 100% or less.

In the novel cleaning composition, the essentially discrete particles made from the thermoplastic (A) and capable of plastic deformation have a very effective cleaning action, while the amorphous or semicrystalline thermoplastic (B) acts as a liquid or flowable carrier for the particles, which are made from the thermoplastic (A) and/or contamination which has been released, and are capable of plastic deformation. The very effective cleaning action results in a very rapid change from one material to the next, even if the change of material to be undertaken is from dark colors or black to light colors, or from an opaque or colored material to a glass-clear material.

Another particular advantage is that the cleaning action of (A) is not restricted to the use of a polymer (B) having a melting point below the brittleness temperature (Tg). In principle, any polymer (B) whose melting point is below that of the polymer (A) is suitable.

A further advantage is that the particles made from the thermoplastic (A) and capable of plastic deformation can also pass without difficulty through narrowing sections of the extruder, for example adapters or connector pieces. Their capacity for plastic deformation means that in an extreme case they are elongated to give long thin filaments. This means that the cleaning composition can even be injected into cavities with low molding wall thicknesses of, for example, 0.4 mm. Another particular advantage is that in injection-molding machines there is no need to disassemble the nozzle in the machine. Even shut-off nozzles can be left on the machine. The cleaning procedure can also be carried out with hot-runner molds. The cleaning composition can be injected through the hot runner into the cavity, and the change of material in the hot runner can thus be accelerated.

It has also been found that the claimed cleaning composition gives an extremely low wear rate, and experiments using a wear-model method for flowable plastified plastic molding compositions show that the wear corresponds to that for an unfilled, i.e. unreinforced, thermoplastic ("Verschleiß in der Kunststoffverarbeitung: Phänomene und Schutzmaßnahmen", Günter Menning, Hanser Verlag 1990, pp. 194–197).

The percentage proportions by weight of thermoplastic (A) and thermoplastic (B) may be from 5 to 30% by weight and, respectively, from 70 to 95% by weight, preferably from 5 to 25% by weight and, respectively, from 75 to 95% by weight and particularly preferably from 7 to 15% by weight and, respectively, from 85 to 93% by weight.

In a preferred embodiment of the cleaning composition, the thermoplastic (A) has been selected from the group consisting of partially aromatic polyamides, polyaryl ethers, in particular polysulfones and polyether sulfones, polyaryl ether ketones, polyether ether ketones, polyphenylene ethers and mixtures of these.

The partially aromatic polyamides may, for example, have been built up from terephthalic acid, isophthalic acid, caprolactam, adipic acid, hexamethylene diisocyanate, m-xylenediamine and/or 2-methylpentamethylenediamine.

Other suitable polyamides are obtainable by copolymerizing two or more of the abovementioned monomers, or mixtures of two or more polyamides, in any desired mixing ratio.

Partially aromatic, semicrystalline copolyamides of this type are, for example, built up from units which derive from terephthalic acid and hexamethylenediamine. The proportion of units of this type may be from 20 to 90% by weight.

Besides these units, the copolyamides comprise units which derive from the ε-caprolactam and/or units which derive from adipic acid and hexamethylenediamine and/or units which derive from other polyamide-forming monomers.

The proportion of units which derive from ε-caprolactam is not more than 50% by weight, preferably from 20 to 50% by weight, in particular from 25 to 40% by weight, while the proportion of units which derive from adipic acid and hexamethylenediamine is up to 80% by weight, preferably from 30 to 75% by weight and in particular from 35 to 60% by weight.

The copolyamides may also comprise both units of ε-caprolactam and units of adipic acid and hexamethylenediamine; in this case it is advantageous if the proportion of units which are free from aromatic groups is at least 10% by weight, preferably at least 20% by weight. The ratio here between the units which derive from ε-caprolactam and from adipic acid and hexamethylenediamine is not subject to any particular limitation.

Advantageous polyamides which should be mentioned comprise from 50 to 80% by weight, in particular from 60 to 75% by weight, of units which derive from terephthalic acid and hexamethylenediamine, and from 20 to 50% by weight, preferably from 25 to 40% by weight, of units which derive from ε-caprolactam.

The partially aromatic copolyamides may also comprise up to 40% by weight, preferably from 10 to 30% by weight and in particular from 20 to 30% by weight, of other polyamide-forming monomers, as are known from other polyamides. Those which should be mentioned here are aromatic dicarboxylic acids which have from 8 to 16 carbon atoms. Examples of suitable aromatic dicarboxylic acids are isophthalic acid, substituted terephthalic acids and substituted isophthalic acids, for example 3-tert-butylisophthalic acid, dicarboxylic acids having more than one ring, e.g. 4,4'- and 3,3'-diphenyldicarboxylic acid, 4,4'- and 3,3'-diphenylmethanedicarboxylic acid, 4,4'- and 3,3'-diphenyl sulfone dicarboxylic acid, 1,4- and 2,6-naphthalenedicarboxylic acid and phenoxyterephthalic acid, particularly preferably isophthalic acid.

Other polyamide-forming monomers may derive from dicarboxylic acids having from 4 to 16 carbon atoms and from aliphatic or cycloaliphatic diamines having from 4 to 16 carbon atoms, or also from aminocarboxylic acids, and, respectively, corresponding lactams, having from 7 to 12 carbon atoms. Suitable monomers which should be mentioned of these types include suberic acid, azelaic acid and sebacic acid as representatives of aliphatic dicarboxylic acids, and 1,4-butanediamine, 1,5-pentanediamine and piperazine as representatives of the diamines, and caprylolactam, enantholactam, ω-aminoundecanoic acid and laurolactam as representatives of lactams and, respectively, aminocarboxylic acids.

Particularly preferred compositions for component (A) here are: from 65 to 85% by weight of units which derive from terephthalic acid and hexamethylenediamine, and from 15 to 35% by weight of units which derive from isophthalic acid and hexamethylenediamine or from 50 to 70% by weight of units which derive from terephthalic acid and hexamethylenediamine, and from 10 to 20% by weight of units which derive from adipic acid and hexamethylenediamine, and from 20 to 30% by weight of units which derive from isophthalic acid and hexamethylenediamine.

If cyclic aliphatic diamines are present as polyamide building blocks, particularly preferred diamine components in this case are bis(4-aminocyclohexyl)methane, bis(4-amino-3-methylcyclohexyl)methane, 2,2-bis(4-aminocyclohexyl)propane, 2,2-bis(4-amino-3-methylcyclohexyl)propane, cyclohexanediamine and isophoronediamine. Partially aromatic, semicrystalline polyamides of this type are described in DE-A 44 04 250.

Other partially aromatic copolyamides which have proven particularly advantageous are those whose triamine content is less than 0.5% by weight, preferably less than 0.3% by weight. These copolyamides may be prepared by the processes described in EP-A 129 195 and EP-A 129 196.

The polyaryl ethers used preferably have repeat units of the formula (I)

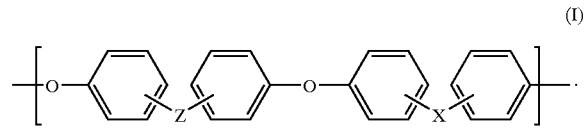

It is also possible to use the ring-substituted derivatives of these. Preferred substituents are $C_1$–$C_6$-alkyl, such as methyl, ethyl, n-propyl, isopropyl, n-butyl, isobutyl or tert-butyl, $C_1$–$C_6$-alkoxy, such as methoxy or ethoxy, aryl, in particular phenyl, chlorine or fluorine. The variable X may be —$SO_2$—, —SO—, —O—, —CO—, —N═N—, —RC═CR$^1$—, —CR$^2$R$^3$— or a chemical bond. The variable Z may be —$SO_2$—, —SO—, —N═N— or —RC═CR$^3$—. Each of R and R$^1$ here is hydrogen, $C_1$–$C_6$-alkyl, such as methyl, ethyl, n-propyl, isopropyl or n-hexyl, $C_1$–$C_6$-alkoxy, including methoxy, ethoxy, n-propoxy, isopropoxy and n-butoxy, or aryl, in particular phenyl. Each of R$^2$ and R$^3$ may be hydrogen or a $C_1$–$C_6$-alkyl, in particular methyl. However, they may also be linked together to give a $C_4$–$C_{10}$-cycloalkyl ring, such as a cyclopentyl or cyclohexyl ring, which in turn may have substitution by one or more alkyl groups, preferably methyl. In addition, R$^2$ and R$^3$ may also be a $C_1$–$C_6$-alkoxy, such as methoxy or ethoxy, or aryl, in particular phenyl. The abovementioned groups may in turn each have substitution by chlorine or fluorine. The polyaryl ethers may be built up entirely from repeat units of the formula (I).

The molar masses (number average $M_n$) of the polyaryl ethers suitable for use as thermoplastic (A) are generally from 1500 to 60,000 g/mol.

Suitable polyaryls ethers also include copolymers built up from polyaryl ether segments and structural units selected from the group consisting of polyesters, aromatic polycarbonates, polyester carbonates, polysiloxanes, polyimides, polyamideimides and polyether imides. The molar masses $M_w$ of the polyaryl ether blocks and, respectively, of the polyaryl ether graft branches in copolymers of this type are generally from 1000 to 30,000 g/mol.

The blocks of different structure may have an alternating or random arrangement in the copolymers. The proportion by weight of the polyaryl ethers in the copolymers is generally from 3 to 97%, preferably from 10 to 90% and in particular from 20 to 80%.

Mixtures of different polyaryl ethers may also be used as thermoplastic (A).

Some suitable repeat units are listed below:

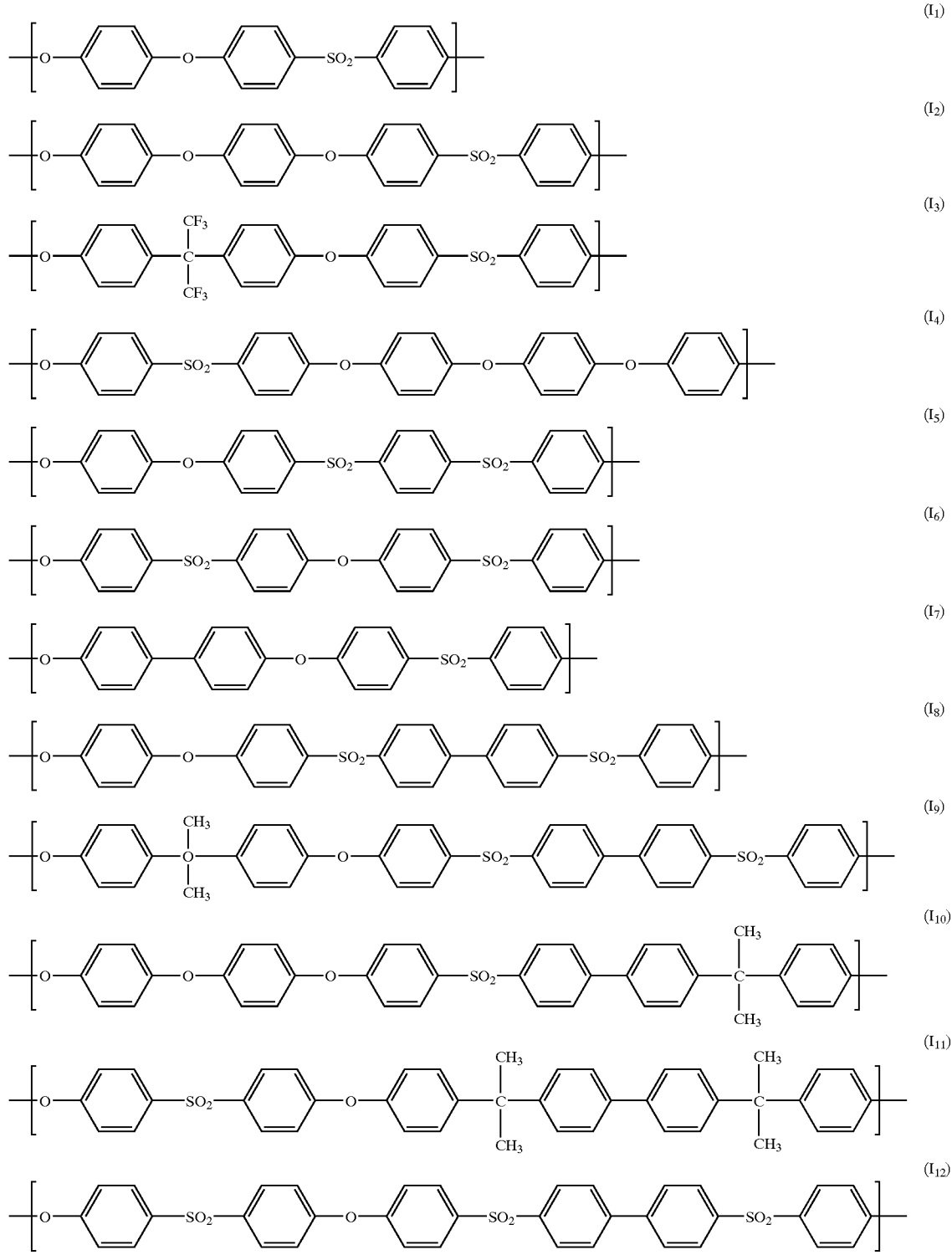

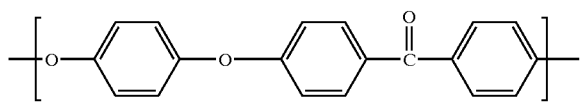 (I₁₃)
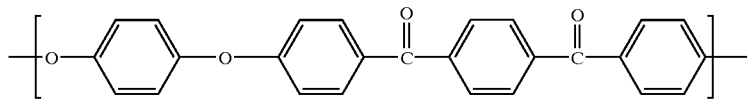 (I₁₄)
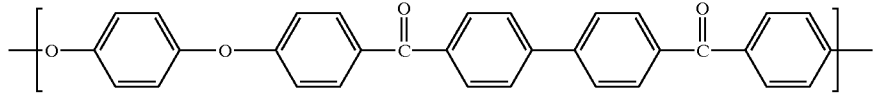 (I₁₅)
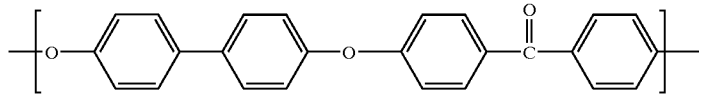 (I₁₆)
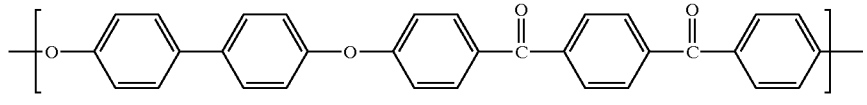 (I₁₇)
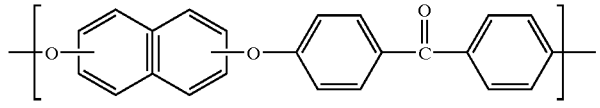 (I₁₈)
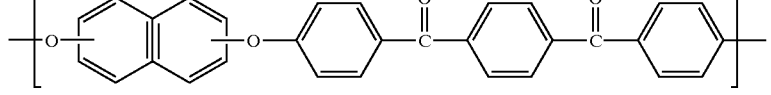 (I₁₉)
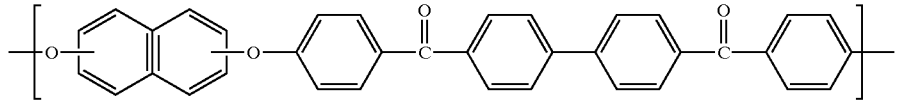 (I₂₀)
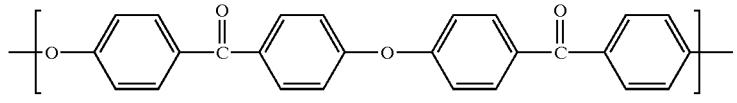 (I₂₁)
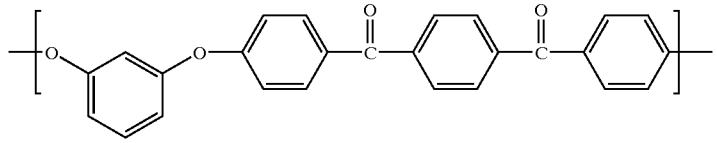 (I₂₂)
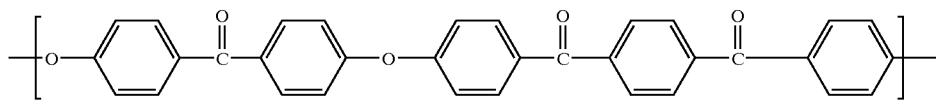 (I₂₃)
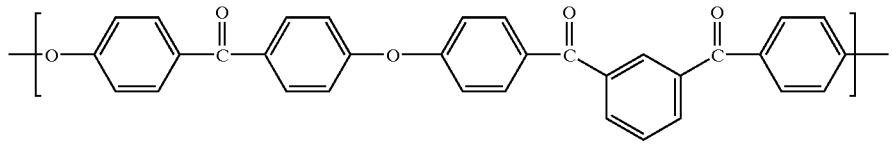 (I₂₄)
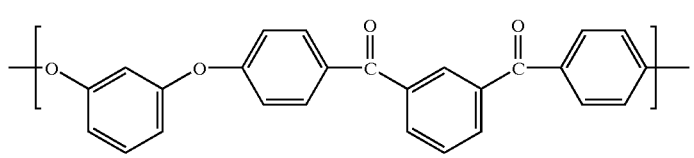 (I₂₅)

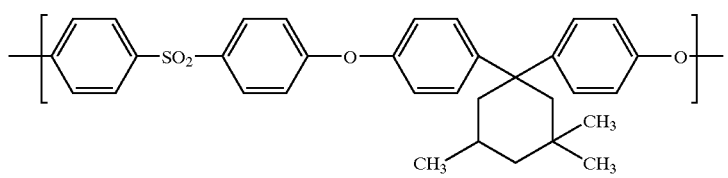
(I₂₆)

Particularly preferred polyaryl ethers include those having from 0 to 100 mol % of repeat units of the formula (II):

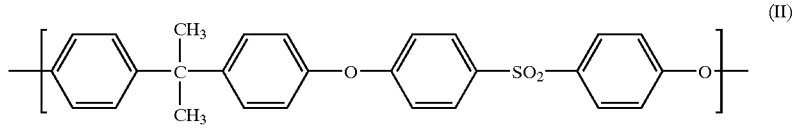
(II)

and from 0 to 100 mol % of repeat units of the formula (III):

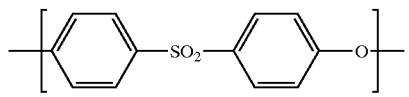
(III)

The molar percentage data is based on the content of $SO_2$ groups. Particular preference is given to the use of polyaryl ethers having from 3 to 97 mol % repeat units of the formula (II) and from 3 to 97 mol % of repeat units of the formula (III) as thermoplastic (A).

Polyaryl ether ketones, which may likewise be used as thermoplastic (A) in the novel cleaning composition, are known per se, and the literature also describes methods for their preparation.

Preferred polyaryl ether ketones contain repeat units of the formula (IV)

$$(O-Ar^1)_x-(T-Ar^2)_y-OAr^3-CO-(Ar^4-Q_z)-Ar^5 \quad (IV)$$

where $Ar^1$ to $Ar^5$ may be identical or differ from one another and, independently of one another, are an aromatic radical having from 6 to 18 carbon atoms. Examples of suitable radicals $Ar^1$ to $Ar^5$ are phenylene, biphenylene, terphenylene, 1,5-naphthylene, 1,6-naph-thylene, 1,5-anthrylene, 9,10-anthrylene and 2,6-anthrylene. Among these, preference is given to 1,4-phenylene and 4,4'-biphenylene. These aromatic radicals are preferably unsubstituted. However, they may carry one or more substituents. Examples of suitable substituents are alkyl, arylalkyl, aryl, nitro, cyano, alkoxy or halogens. Preferred substituents include alkyl having up to 10 carbon atoms, such as methyl, ethyl, isopropyl, n-hexyl and isohexyl, $C_1$–$C_{10}$-alkoxy, such as methoxy, ethoxy, n-propoxy and n-butoxy, aryl having up to 20 carbon atoms, such as phenyl or naphthyl, and also fluorine and chlorine. T and Q may be identical or differ from one another and, independently of one another, are —O—, —SO₂—, —CO— or —COO—, preferably —O— or —CO—.

The variables x, y and z may be identical or differ from one another and, independently of one another, are integers from 0 to 3.

Examples of polyaryl ether ketones which should be mentioned comprise repeat units selected from the group consisting of units (I)

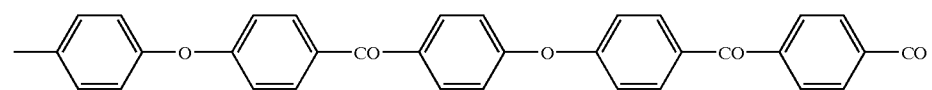
(I₁)

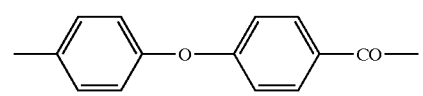
(I₂)

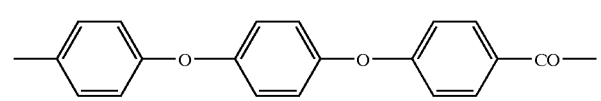
(I₃)

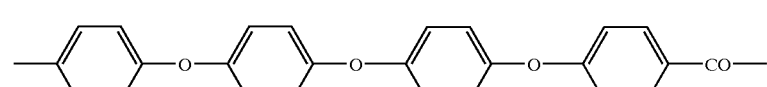
(I₄)

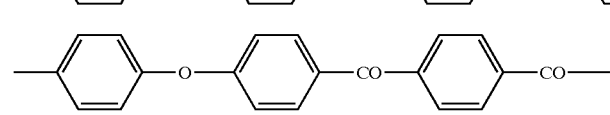
(I₅)

-continued

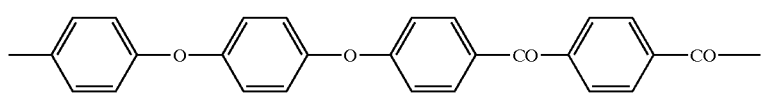
(I₆)

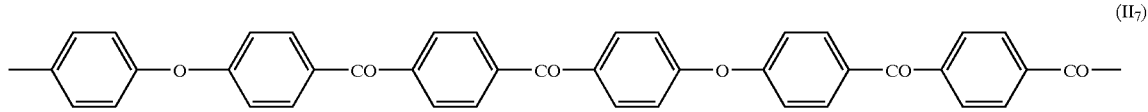
(II₇)

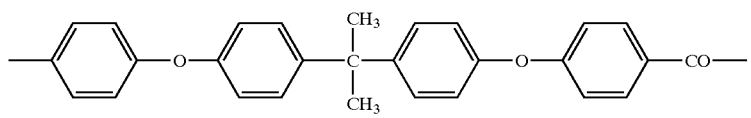
(II₈)

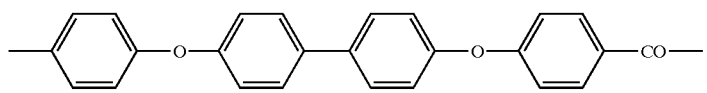
(II₉)

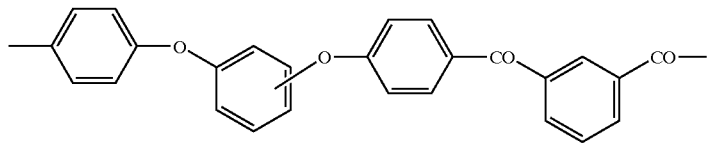
(II₁₀)

either alone or combined with other units.

The polyaryl ether ketones may also be random or ordered copolymers, such as alternating or block copolymers. It is also possible to use mixtures of different polyaryl ether ketones. The polyaryl ether ketones generally have melt volume rates (MVR) of from 20 to 500 cm³/10 min (measured to DIN 53 735 at 400° C. and with a load of 10 kg). Preference is given to polyaryl ether ketones with melt volume rates of from 30 to 450 cm³/10 min (measured to DIN 53 735 at 400° C. and with a load of 10 kg).

The thermoplastic (B) in the novel cleaning composition may be selected from the group consisting of polyolefins, polyoxymethylene homo- or copolymers, polycarbonates, polyesters, polyamides, vinylaromatic polymers or mixtures of these. With regard to the polyamides mentioned, the substances used from this class are of course different from those which can be used as thermoplastic (A). The selection of substance from this class depends, for thermoplastic (A) and thermoplastic (B), on the abovementioned properties required in each case.

The thermoplastic (A) may be present in the form of pellets in the cleaning composition. The preferred shapes and dimensions are those of cylindrical or lenticular pellets with a diameter of from 1 to 6 mm and a length of from 1 to 8 mm.

The novel cleaning composition may also comprise one or more additives selected from reinforcing agents, processing aids, UV stabilizers, heat stabilizers and flame-retardant additives.

Selected examples are used below to describe the invention in greater detail.

Tests of the Cleaning Action of the Mixture

EXAMPLE 1

A Mannesmann Demag Ergotech 100/310 injection-molding machine with a locking force of 1000 kN and a screw diameter of 30 mm, which is processing glass-fiber-reinforced nylon-6,6 with a black pigmentation (processing temperature 285° C.) is to be changed over to a low-viscosity, unreinforced nylon-6,6 with pale red pigmentation (processing temperature 285° C.). The mold is a single-cavity mold for a housing with externally heated hot runner, manufactured by Eurotool, with a gate diameter of 0.8 mm.

1st Cleaning Run 3 kg of a cleaning mixture of the composition given below are first placed in the hopper of the injection-molding machine and processed into moldings at an unchanged processing temperature (285° C.). The cleaning mixture is composed of: thermoplastic (A): nylon-6,T/6 in a ratio 70:30, with a viscosity number (VN) of 130 g/ml (measured as a 0.5% strength by weight solution in 96% strength $H_2SO_4$), with a melting point Tm=298° C., a glass transition temperature Tg=105° C. (measured by DSC) and a crystallinity of 40%, measured by X-ray diffraction; thermoplastic (B): nylon-6,6, VN=140 g/ml (measured as a 0.5% strength by weight solution in 96% strength $H_2SO_4$), with a mixing ratio of thermoplastic (A) to thermoplastic (B) of 1:10, corresponding to mixing 0.3 kg of nylon-6,T/6 with 2.7 kg of nylon-6,6.

The cleaning mixture is then followed by 3 kg of nylon-6,6 with pale red pigmentation. The total time taken is 40 min. Visual assessment of the moldings subsequently produced reveals neither dark streaks nor any material from the cleaning mixture.

1st Comparative Cleaning Run

The procedure is as for cleaning run 1, but there is no flushing with the cleaning mixture mentioned there, but the run continues with unreinforced nylon-6,6 with pale red pigmentation. The run initially continues with 15 kg of nylon-6,6. The housings manufactured still show dark streaks in the sprue area, even after 50 shots have been completed. The needle valve nozzle is then disassembled and replaced with a cleaned nozzle in the machine. Injection moldings are again produced after the nozzle in the machine has been heated, but dark contamination can still be detected on the surfaces of the moldings. The surface quality of the moldings is not satisfactory until 400 moldings have been completed and rejected. The total time required is 5 hours and the material usage is 40 kg.

2nd Comparative Cleaning Run

The procedure is as in cleaning run 1. The processing temperature is 285° C. However, the cleaning mixture is composed of: Thermoplastic (A): Nylon-4,6, VN 129 g/ml (measured as a 0.5% strength by weight solution in 96% strength $H_2SO_4$), Tm=295° C., Tg=75° C., crystallinity 60%

Thermoplastic (B): Nylon-6,6, VN=140 g/ml (measured as a 0.5% strength by weight solution in 96% strength $H_2SO_4$) The mixing ratio of thermoplastic (A) to thermoplastic (B) is 1:10 (0.3 kg of nylon-4,6 and 2.7 kg of nylon-6,6).

At the processing temperature of 285° C., no melt can be injected through the gate system, since unmelted grains from the pellets block the gate. The processing temperature has to be increased to 310° C. At this temperature the nylon-4,6 added is molten and has lost its cleaning action. Cleaning is continued as described in the first comparative cleaning run. The time required is 5.5 hours and the material usage is 40 kg.

EXAMPLE 2

A Netstal Neomat 170/90 machine with a screw diameter of 32 mm, equipped with a spring-loaded needle valve nozzle is producing housings made from black, flame-retardant polystyrene (processing temperature 220° C.) and is to be changed over to glass-clear polystyrene (processing temperature 220° C.).

1st Cleaning Run

The cleaning mixture of nylon-6,T/6 and polystyrene in a mixing ratio of 15:85, as stated above, is used.

3 g of cleaning mixture are first run through the injection unit at 220° C. This is followed by 3 kg of polystyrene. Production of the glass-clear polystyrene housings can continue after a total of only 35 min.

1st Comparative Cleaning Run

1% of a cleaning liquid which comprises 84% of $H_2O$ and 16% of potassium carbonate is added to 3 kg of glass-clear polystyrene. This cleaning liquid corresponds to the data in DE-A-38 02 127. The mixture is extruded from the injection unit at 220° C. Injection moldings made from glass-clear polystyrene are then produced. Although the moldings are free of any black pigmentation, they are not glass-clear, but milky and cloudy. There is no change to this result even after a further 100 shots have been completed. The injection unit has to be disassembled and cleaned mechanically. The time required for this is 6 hours.

EXAMPLE 3

A klöckner Ferromatik FM160 injection-molding machine with a screw diameter of 40 mm was processing polysulfone (processing temperature 340° C.) and is to be changed over to processing nylon-6,6 with a processing temperature of 290° C. Headlamp reflectors are being produced.

Cleaning Run 1

In a first step, 5 kg of a cleaning mixture composed of polyaryl ether ketone (PAEK) with a melting point Tm=381° C., a glass transition temperature Tg=170° C. and a crystallinity of 33% with nylon-6,T/6 (as described in Example 1) in a mixing ratio of 1:10 are run through the injection unit at a processing temperature of 340° C. In the next step, the processing temperature is lowered to 310° C. and 5 kg of the same polyaryl ether ketone in the form of a cleaning mixture with nylon-6,6 in a mixing ratio of 1:10 are then run. The temperature is then lowered to 290° C. and 3 kg of the following nylon-6,6 are processed. Production is then restarted. The moldings are free from foreign material and have a satisfactory surface. The time required was 50 min.

Cleaning Run as in the Prior Art

Experience has shown that in the case of a change from polysulfone to nylon-6,6 the metal surfaces, of the injection unit, which convey the melt have to be cleaned mechanically. It takes a total of 12 hours of work to disassemble the nozzle in the machine, the cylinder head and the screw together with screw tip, blocking ring and thrust ring, and then clean the metal surfaces with a wire brush and similar tools, and then assemble the cleaned machine parts. During this period the machine cannot be operated.

1st Comparative Cleaning Run

The 1st comparative cleaning run is carried out with a processing temperature of 285° C., as in the cleaning run, but with 10 kg of a cleaning mixture composed of nylon-4,6, VN 129 g/ml (measured as a 0.5% strength by weight solution in 96% strength $H_2SO_4$), a melting point Tm=295° C., a glass transition temperature Tg=75° C. and a crystallinity of 60%, and nylon-6,6, VN=140 g/ml (measured as 0.5% strength by weight solution in 96% strength $H_2SO_4$) in a mixing ratio of 1:10. After this, 5 kg of nylon-6,6 is run at 290° C. The resultant moldings have areas of brown contamination on the surface. The cleaning procedure is repeated, but without any subsequent improvement in the quality of the molding surface. The experiment is terminated, and cleaning run 2 is carried out correspondingly.

Tests of the Wear Performance of the Cleaning Mixtures Used

The wear-performance tests were carried out using a wear-model mold described in "Verschleiβ in Kunststoffverarbeitung: Phänomene und Schutzmaβnahmen", Günter Menning, Hanser Verlag 1990, pp. 194–197. The machine used was an Arburg Allrounder 270E with a locking force of 500 kN and a screw diameter of 25 mm. The weight loss of wear inserts is measured after 1000 moldings have been completed.

1. Cleaning composition made from nylon-6,6 with nylon-6/6,T, at a processing temperature of 280° C.:
   Weight loss<1 mg
2. Cleaning composition made from unreinforced nylon-6,6, at a processing temperature of 280° C.:
   Weight loss<1 mg
3. Cleaning composition made from nylon-6,6 reinforced with 35% by weight of glass fibers, at a processing temperature of 280° C.:
   Weight loss: 50 mg The results show that no significant wear could be found in Experiments 1 and 2. When processing thermoplastics comprising glass-fiber reinforcement (product 3) it is usual in industry to use additional wear protection for the metal surfaces conveying the melt.

We claim:

1. A cleaning composition for apparatus for processing thermoplastic melts, which composition comprises discrete particles capable of plastic deformation and made from a thermoplastic (A) with a melting point above 250° C. and with a crystallinity of not more than 50%, and comprises an amorphous or semicrystalline thermoplastic (B) with a processing temperature below the melting point of the thermoplastic (A), where the proportion of the thermoplastic (A) is from 1 to 95% by weight and that of the thermoplastic (B) is from 5 to 95% by weight, and the total of the percentage proportions by weight of (A) and (B) is always 100% or less, wherein thermoplastic (A) is selected from the group consisting of partially aromatic polyamides, polysulfonates, polyether sulfonates, polyaryl ether ketones, polyether ether ketones, polyphenylene ethers and mixtures of these.

2. A cleaning composition as claimed in claim 1, wherein the percentage proportions by weight of thermoplastic (A)

and thermoplastic (B) are from 5 to 30% by weight and, from 70 to 95%, respectively.

3. A cleaning composition as claimed in claim 1, wherein the thermoplastic (B) has been selected from the group consisting of polyolefins, polyoxymethylene homo- or copolymers, polycarbonates, polyesters, polyamides, vinylaromatic polymers and mixtures of these.

4. A cleaning composition as claimed in claim 1, wherein the thermoplastic (A) is in the form of pellets.

5. A cleaning composition as claimed in claim 1, which additionally comprises one or more additives selected from reinforcing agents, processing aids, UV stabilizers, heat stabilizers and flame-retardant additives.

6. A cleaning composition as in any one of claims 1, 2, 3 and 4 wherein thermoplastic (A) is a partially aromatic polyamide.

7. A cleaning composition as claimed in claim 6, wherein the structure of the partially aromatic polyamide is composed of terephtalic acid, isophthalic acid, caprolactam, adipic acid, hexamethylene diisocyanate, m-xylylenediamine, and/or 2-methylpentamethylenediamine.

8. A cleaning composition as claimed in claim 7, wherein use is made of copolymers of two or more of the monomers mentioned, or a mixture of these.

9. A cleaning composition as claimed in claim 8, wherein the structure of the copolymers is composed of units which derive from terephthalic acid and from hexamethylenediamine.

10. A cleaning composition as claimed in claim 9, wherein the polyamides contain units which derive from the ε-caprolactam and/or from adipic acid and/or from hexamethylenediamine.

* * * * *